(12) United States Patent
Gomez

(10) Patent No.: US 7,562,154 B2
(45) Date of Patent: Jul. 14, 2009

(54) SYSTEM AND METHOD FOR FILTERING STALE MESSAGES RESULTING FROM MEMBERSHIP CHANGES IN A DISTRIBUTED COMPUTING ENVIRONMENT

(75) Inventor: Juan Carlos Gomez, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 910 days.

(21) Appl. No.: 10/611,133

(22) Filed: Jun. 30, 2003

(65) Prior Publication Data

US 2004/0267901 A1 Dec. 30, 2004

(51) Int. Cl.
*G06F 15/173* (2006.01)

(52) U.S. Cl. .......................... 709/238; 370/351; 713/1; 707/201; 707/202

(58) Field of Classification Search ................ 709/217, 709/224, 242; 370/351; 713/1; 707/201–202
See application file for complete search history.

(56) References Cited

U.S. PATENT DOCUMENTS

| | | | | |
|---|---|---|---|---|
| 5,481,673 | A * | 1/1996 | Michelson ................. | 709/242 |
| 5,999,712 | A * | 12/1999 | Moiin et al. ................ | 709/220 |
| 6,014,669 | A * | 1/2000 | Slaughter et al. ............. | 707/10 |
| 6,058,116 | A * | 5/2000 | Hiscock et al. ............. | 370/401 |
| 6,078,957 | A * | 6/2000 | Adelman et al. ............ | 709/224 |
| 6,195,349 | B1 * | 2/2001 | Hiscock et al. ............. | 370/360 |
| 6,393,485 | B1 * | 5/2002 | Chao et al. ................. | 709/231 |
| 6,438,705 | B1 * | 8/2002 | Chao et al. ..................... | 714/4 |
| 6,449,641 | B1 * | 9/2002 | Moiin et al. ................ | 709/220 |
| 6,718,486 | B1 * | 4/2004 | Roselli et al. ................ | 714/41 |
| 6,990,668 | B1 * | 1/2006 | Miller et al. ................ | 718/106 |
| 2002/0049845 | A1 * | 4/2002 | Sreenivasan et al. ........ | 709/226 |
| 2002/0103884 | A1 * | 8/2002 | Duursma et al. ............ | 709/219 |
| 2002/0120717 | A1 * | 8/2002 | Giotta ........................ | 709/219 |
| 2003/0069924 | A1 * | 4/2003 | Peart et al. .................. | 709/203 |
| 2003/0101451 | A1 * | 5/2003 | Bentolila et al. .............. | 725/34 |
| 2003/0225899 | A1 * | 12/2003 | Murphy ...................... | 709/230 |
| 2004/0044797 | A1 * | 3/2004 | Kinowski et al. ........... | 709/250 |
| 2004/0148326 | A1 * | 7/2004 | Nadgir et al. ............... | 709/200 |

(Continued)

OTHER PUBLICATIONS

Technical Disclosure Bulletin, "Multisequencing a Single Instruction Stream Virtualizing the Message Handling System" vol. 36 No. 04 Apr. 1993.

(Continued)

*Primary Examiner*—Kenny S Lin
*Assistant Examiner*—Tauqir Hussain
(74) *Attorney, Agent, or Firm*—Khanh Q. Tran; Lewis Nunnelley

(57) ABSTRACT

A cluster computer system capable of filtering stale messages resulting from changes in a cluster membership. The system has interconnected nodes each hosting one or more applications and having a node filter for filtering messages to and from other nodes based on a membership identification and information about source nodes and destination nodes of the messages. Each application of a hosting node includes multiple application filters corresponding to other nodes in the system for filtering messages to and from the application based on the membership identification and an application view of the cluster membership. Each node further includes a communication agent for detecting when another node is disconnected from the membership and for updating its filters with the membership identification that reflects the node disconnection.

7 Claims, 6 Drawing Sheets

U.S. PATENT DOCUMENTS

2004/0205414 A1* 10/2004 Roselli et al. .................. 714/39
2005/0198292 A1* 9/2005 Duursma et al. ............ 709/225
2006/0195525 A1* 8/2006 Page et al. .................. 709/206

OTHER PUBLICATIONS

"Efficient Communication Using Message Prediction for Cluster of Multiprocessors" by Ahmad Afsahi et al. Publication—Concurrency and Computation Practice and Experience, V 14, No. 10, p. 859-883, 2002.

An Adaptive Communication for Heterogeneous Network Computing, Publication—Proceedings of HCW01, Apr. 2001.

Scalable Monitoring and Configuration Tools for Grids and Clusters, Proceedings of the 10th Euromicro Workshop on Parallel, Distributed and Network Based Processing, 2002.

* cited by examiner

SYSTEM AND METHOD FOR FILTERING STALE MESSAGES RESULTING FROM MEMBERSHIP CHANGES IN A DISTRIBUTED COMPUTING ENVIRONMENT

TECHNICAL FIELD

The invention relates to computer systems, and more particularly to a system and method for filtering stale messages caused by membership changes in a distributed computer supporting multi-process or multi-thread applications.

BACKGROUND OF THE INVENTION

When an application is distributed across a cluster of computer nodes, there must be some coordination between cluster membership changes and inter-node messages issued by the distributed application. The main goal of such coordination is to prevent nodes that have recently left or joined the cluster membership from issuing messages to the nodes in the cluster that have not had a chance to process the membership change. The coordination is needed to ensure a consistent and correct execution of the application in the computer cluster. Without this coordination, the distributed application may execute less efficiently or, in the worst case, incorrectly. In most existing cluster systems, the coordination is achieved by integrating a cluster membership manager with an inter-node messaging system. Such a system would flush all inter-node messages that were in transition between the cluster nodes when a cluster membership changed. It then processes the cluster membership change while halting all inter-node communication, and re-enables inter-node communication when all the nodes have processed and accepted the new cluster membership. This technique is known in the technical field as Virtual Synchrony.

A well-known virtual synchrony system is described by K. Birman et al., in the publication entitled "Reliable Communication in the Presence of Failures," ACM Transactions in Computer Systems, Vol. 5, No. 1, Feb., 1987. A main disadvantage of this system is that it requires a costly cluster wide synchronization of all inter-node communications with each membership change. The system also halts all inter-node communications until the new cluster membership is accepted by all of the cluster nodes. This requirement significantly affects the performance of any distributed application running in the cluster. In addition, the system is intended for handling mainly multicast communication across the cluster, rather than unicast messaging between cluster nodes. Like other virtual synchronous systems, membership changes need to be synchronized through the whole cluster. In-flight messages are flushed from communication links and buffers when there is a change. Furthermore, new communications among the nodes are halted until the new membership is confirmed by every member node in the cluster. These requirements impose significant disruption and delay to the communication between the nodes that are not involved in the membership change.

Virtual synchronous systems are particularly inefficient for running distributed applications. For this class of applications, a large cluster might be maintained in the membership, but relatively independent distributed tasks might run only in subsets of this membership, i.e., its sub-clusters. This distribution results in inter-node communication patterns that are mostly restricted to sub-clusters.

Another method for filtering of stale messages associated with the nodes affected by a cluster membership change is described by Sreenvasan et al. in "Maintaining Membership in High Availability Systems," U.S. patent application Ser. No. 20020049845A1. The Sreenvasan method is a receiver-based filtering to eliminate stale membership messages based on an incarnation numbers embedded in inter-node messages. It thus performs the message filtering at the cluster membership daemon level rather than at the application level.

Therefore, there remains a need for a system and method for filtering stale messages caused by membership changes in a distributed computing environment without the above drawbacks of prior art systems.

SUMMARY OF THE INVENTION

It is an object of the present invention to provide a distributed cluster computing system capable of filtering stale messages resulting from membership changes.

It is another object of the invention to provide a distributed cluster system that filters stale messages at both the source node and the destination node of a message.

It is yet another object of the invention to filter at a node the messages to and from other nodes based on a membership identification.

It is still another object of the invention to filter at an application the messages to and from other applications based on the membership identification and an application view of the cluster membership.

To achieve these and other objects, the invention provides a cluster computer system that includes interconnected nodes each hosting multiple distributed application agents, a node filter in each node and a set of application filters for each application agent. The node filter discards messages to and from other nodes based on an identification of the membership. The filtering of the messages by the node filter is further based on information about source nodes and destination nodes of the messages. Each application filter corresponds to another node in the system and filters messages to and from the associated application based on the membership identification and an application view of the cluster membership. The distributed cluster system further includes a Communication Agent in each node for detecting when another node is disconnected from the membership and for updating the filters in each node with the membership identification reflecting the disconnected node. It also includes a Cluster Membership Agent in each node for keeping track of the membership in the system. The Cluster Membership Agent identifies each successive generation of the membership by a monotonically increasing number and communicates this number to other Cluster Membership Agents when the membership is first established. The membership identification is stored in a global persistent state accessible to all nodes in the system.

The distributed cluster system includes an Application Agent associated with each application for processing application tasks. Cluster membership changes processed by the Cluster Membership Agent in one node are communicated to the Application Agents in this node asynchronously. The filtering of stale messages is decoupled from the processing of cluster membership changes at the nodes in the cluster membership. This filtering is performed for unicast messages rather than multicast messages.

Additional objects and advantages of the present invention will be set forth in the description which follows, and in part will be obvious from the description and the accompanying drawing, or may be learned from the practice of this invention.

DESCRIPTION OF TH PREFERRED EMBODIMENTS

The invention will be described primarily as a system and method for filtering stale messages resulting from membership changes in a distributed cluster computer. However, persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the operations of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

Figure 1:
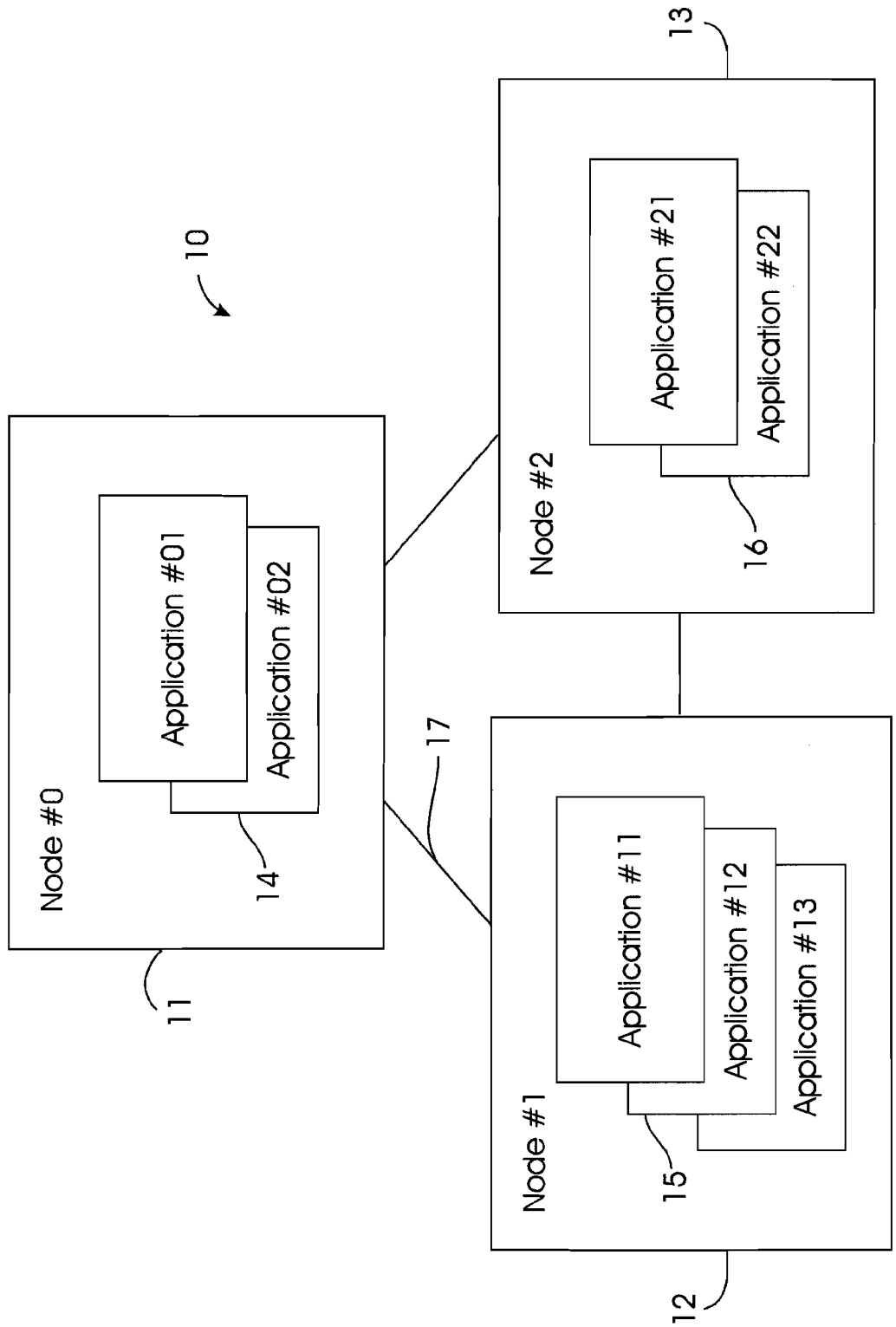
FIG. 1 is a block diagram of a prior art cluster computing system capable of executing distributed applications.

FIG. 1 is a block diagram illustrating a prior art distributed computing system 10 capable of executing distributed applications. The system 10 includes multiple member nodes 11-13 that are interconnected and capable of performing individual tasks of the distributed applications. Although only three nodes are shown in FIG. 1, the distributed system 10 typically includes a much larger number of nodes in order to accommodate typical distributed applications. As an illustration, node 11 (Node # 0) currently executes two application tasks # 01 and # 02. Node 12 (Node # 1) is executing three application tasks # 11, # 12, and # 13. Node 13 (Node # 2) is executing two application tasks # 21 and # 22. The nodes 11-13 communicate with each other by sending and receiving messages over communication links 17. During the operation of the system 10, a cluster of the nodes that collectively execute a distributed application is referred to as a cluster membership.

Figure 2:
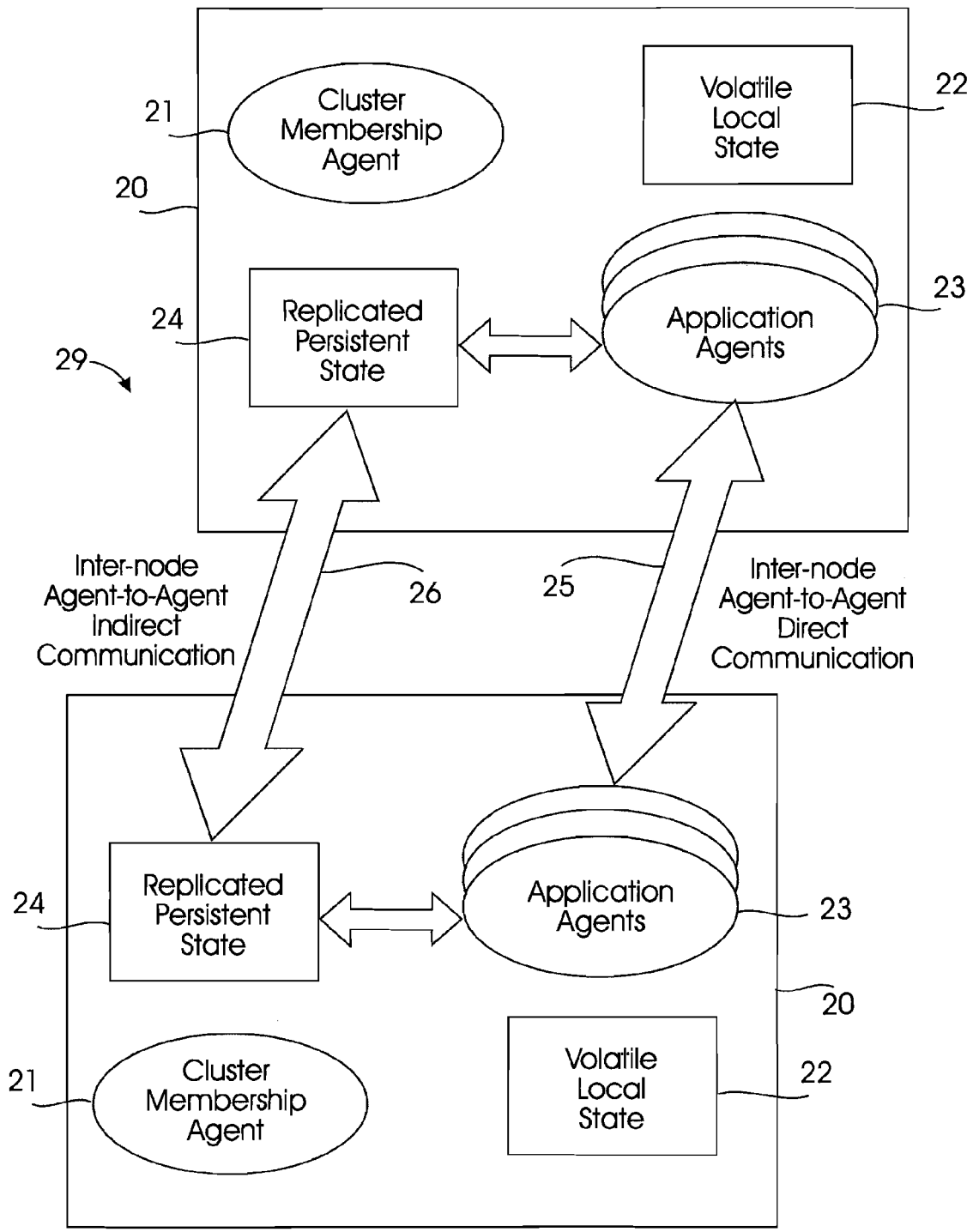
FIG. 2 is a block diagram of a representative cluster computing system with two nodes that are capable of filtering stale messages according to the invention.

FIG. 2 illustrates a preferred embodiment of the nodes in a distributed computing system 29 for filtering stale messages according to the invention. Although two nodes 20 are shown, the invention is applicable to cluster computing systems that include a much larger number of nodes. In the system 29, the management of the cluster membership and exchange of messages among the nodes 20 work as two independent processes, but yet communicate with each other in order to filter stale unicast messages that may be generated by the nodes recently ejected from or accepted into the cluster membership. The system 29 uses source and destination filtering, rather than cluster-wide synchronization, to maintain inter-node unicast communication across a subset of the nodes that remain unchanged during the membership transition. The filtering of the stale messages is done based on a membership view held by the application at the source node and another view held the application at the destination node.

The invention enables distributed applications to execute more efficiently than existing Virtual Synchronous systems because, for the subset of the cluster membership that remains the same, inter-node communication is not interrupted by changes to the cluster membership. This approach is particularly useful for distributed applications that divide the current cluster node set into sub-clusters and execute relatively independent tasks in these sub-clusters. In this situation, sub-cluster inter-node communication is never halted or interrupted during cluster membership changes if the sub-cluster is not affected by such changes.

The distributed system 29 is capable of executing multi-threaded or multi-process distributed applications. Individual tasks of a distributed application are assigned to threads or groups of threads, which are referred to as Application Agents 23 that run on the cluster nodes 20. The distributed environment includes a global persistent state 24 that is replicated across all cluster nodes 20. Each node 20 maintains a volatile local state 22 which is accessible to the Application Agents 23 on that node. The Application Agent 23 in one cluster node 20 communicate with agents in other cluster nodes in two ways: indirectly by modifying the global persistent state 24 and directly by sending and receiving between nodes. These indirect and direct communications are respectively designated as communication paths 26 and 25 in FIG. 2. Each node 20 further has a Cluster Membership Agent 21 for processing membership changes and communicating these changes to the Application Agents 23 in the local node. In the system 29, the nodes 20 in a cluster membership are fully connected to each other, making it unnecessary for any message to be forwarded or routed between cluster nodes. Inter-node communication between the Application Agents 23 is fully decoupled from cluster membership changes, yet cluster membership changes influence message filtering that occurs in a local node 20.

A set of nodes 20 is considered as belonging to a cluster membership if they are fully connected through the direct communication path 25. The Cluster Membership Agent 21 identifies each new membership with a monotonically increasing number referred to as a membership generation number that is kept in a global persistent state 24. The system 29 monitors changes to the current cluster membership and generates a new membership identification as this membership is first created. The cluster membership information received by a particular node might be different from that in other nodes because this node might be still operating with a old membership number. This discrepancy occurs because it takes a certain amount of time to synchronize the agents in this particular node with the new membership. The messages that contain the old membership information are referred to as stale messages. They must be filtered or discarded to improve the efficiency of the system and to insure that the distributed applications are correctly executed. This filtering must be done with minimum disruption to the communication among the nodes whose membership information on the cluster has not changed.

As an example, consider a distributed computation running in a cluster with three member nodes: N0, N1, and N2; where each node is executing three Application Agents: agents a00, a01, and a02 for node N0, agents a10, a11, and a12 for node N1, and agents a20, a21, and a22 for node N2. A message from agent a00 to agent a10 is denoted as m(a00-→a10). Assume that there are several messages in transition relating to the agents in these nodes, m(a01-→a20), m(a11-→a22), and m(a21-→a10), when node N1 left the cluster membership and then rejoined shortly thereafter. Only the messages that were in flight to and from the agents in the node N1 are affected by this membership change and considered as stale messages. The communication between agents located in the nodes that remain in the cluster membership at all times must not be disrupted. It is thus desirable to suppress, or filter, all messages in the system that were in flight to and from node N1 when the change of membership occurred.

Once all the nodes have processed the change in membership, all agents must be able to reestablish regular cross-node communication. In this example, messages m(a00-→a10), m(a11-→a22) and m(a21-→a10) need to be filtered. However, message m(a01-→a20) must be delivered without disruption because it is traveling between two nodes that never left the cluster membership. This result is more significant in a large cluster in which a single node generally experiences temporary failures. It is critical that communication between agents hosted by the non-failing nodes remain uninterrupted while messages from and to the failed node are filtered.

Figure 3:
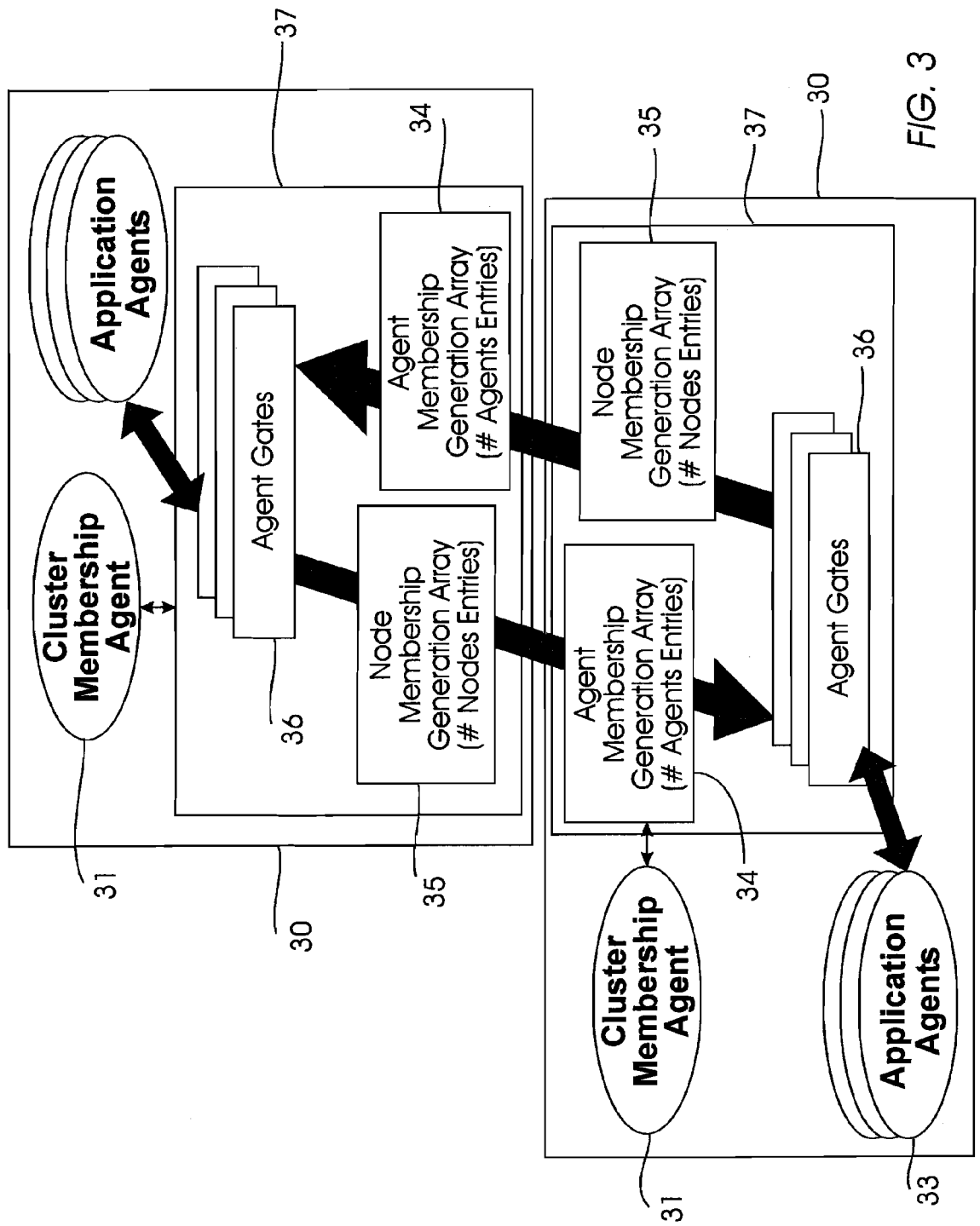
FIG. 3 illustrates the high level components in two cluster nodes for supporting the filtering of stale messages according to the invention.

FIG. 3 illustrates further details of two nodes 30 for filtering the stale messages in accordance with the invention. For clarity, only the Application Agents, Cluster Membership Agents and another component, the Gated Messaging Subsystems, are shown in this figure. Each node 30 includes a Cluster Membership Agent 31, a Gated Messaging Subsystem 37 and Applications Agents 33. The Cluster Membership Agent 31 is responsible for maintaining membership information and obtaining consensus among the nodes 30 in the cluster as to what the current cluster membership is. It performs these functions by monitoring communications between the cluster nodes 30 and voting on what the membership must be when changes occur in the communications. The Cluster Membership Agent 31 then notifies the Gated Messaging Subsystem 37 of the membership changes.

The Gated Messaging Subsystem 37 filters the stale messages at both ends of the communication between the two nodes 30 based on the nodes' local volatile states. The Gated Messaging Subsystem 37 includes a Node Membership Generation array 35, one or more Agent Gates 36, and an Agent Membership Generation array 34. The Node Membership Generation array 35 is maintained based on information provided by the Cluster Membership Agent 31. The Agent Gates 36 are maintained using the information provided by Application Agents 33. The Gated Messaging Subsystem 37 interfaces with the Application Agents 33 when a new membership is known to a node and stores the previous membership in a persistent state.

Figure 4:
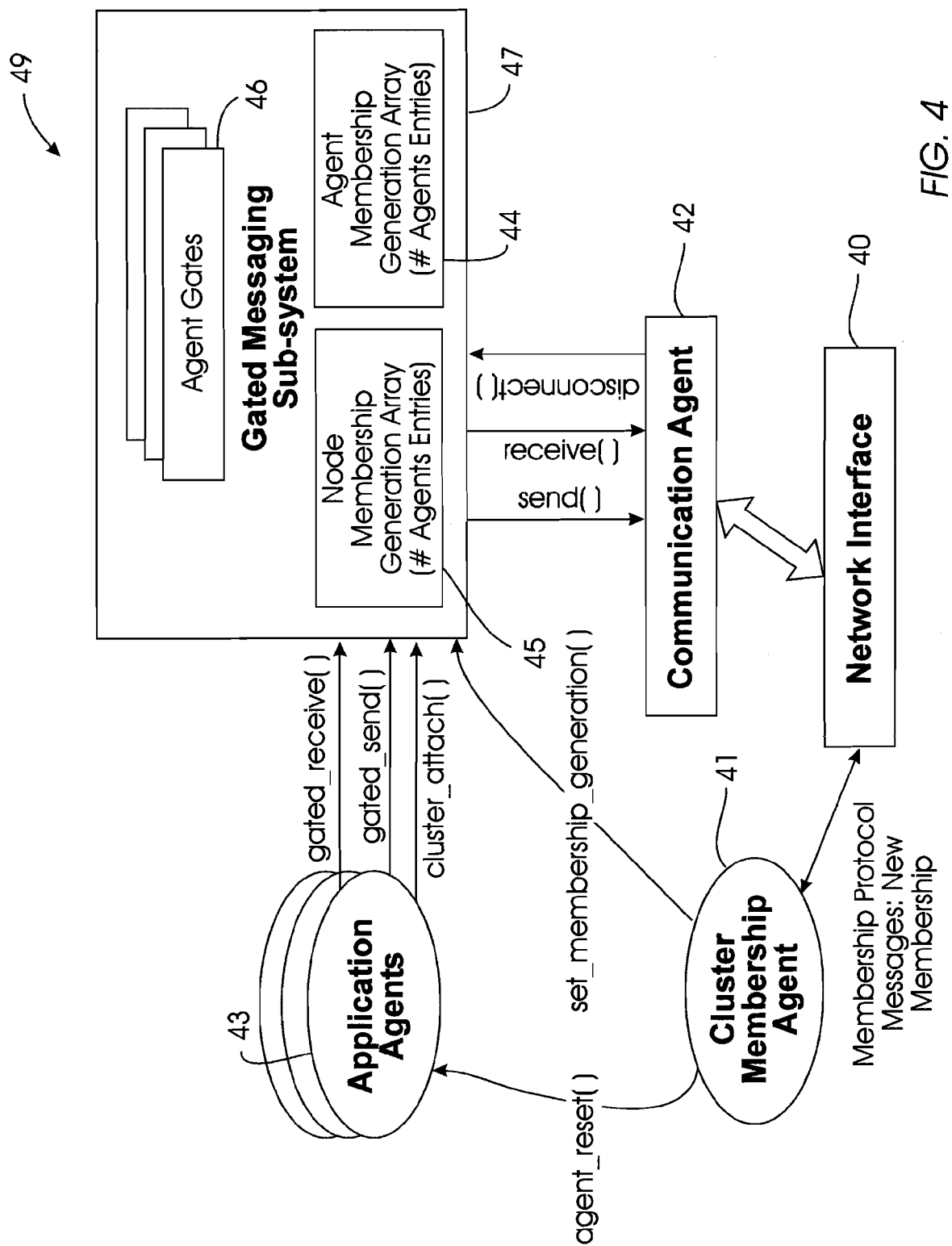
FIG. 4 illustrates a preferred embodiment of a cluster node for supporting the message-filtering operations according to the invention.

FIG. 4 is a diagram showing the interaction among the components in a node 49 of the distributed system of the invention. The node 49 communicates with other nodes through a network interface 40. A Communication Agent 42 performs the actual low-level communication with other nodes by sending messages through the send( ) operation and receiving messages through the receive( ) operation. It notifies the Gated Messaging Subsystem 47 when a remote node is disconnected from the local node 49 through the disconnect( ) operation.

The Application Agents 43 represents the individual entities in the node 49 that execute the distributed application and communicate with their peers in other cluster nodes. The Application Agents 43 interfaces with the Gated Messaging Subsystem 47 through the operations cluster_attach( ), gated_send( ) and gated_send. The cluster_attach( ) operation synchronizes an Application Agent 43 with a given cluster generation. The gated_send( ) and gated_receive( ) operations support message communication between the Application Agents 43 that are not affected by the membership changes. The Cluster Membership Agent 41 notifies the Application Agents 43 of a new membership generation by through the agent_reset( ) operation.

Once an Application Agent 43 is notified of a new membership, it processes the new membership and invokes the cluster_attach( ) operation to notify the Gated Messaging Subsystem 47 that the new membership has been processed. This Application Agent 43 may delay acknowledging a new membership while it is processing other tasks. During this delay, the Application Agent 43 might receive further membership notices. However, it must acknowledge only the last membership generation through the cluster_attach( ) interface.

As described previously in reference to FIG. 3, the Gated Messaging Subsystem 47 includes an Agent Membership Generation array 44, a Node membership Generation array 45 and Agent Gates 46. The Cluster Membership Agent 41 uses the set_membership_generation operation to notify the Gated Messaging System 47 of changes in the cluster membership. The Agent Membership Generation array 44 represents the local perception of the node as to when each other node joined the cluster membership and is maintained by the Application Agents 43 through the cluster_attach( ) operation. In the preferred embodiment of the invention, the Agent Membership Generation array 44 is preferably an array having as many integer entries as there are Application Agents 43 that can be executed in the node. Each entry indicates the last membership generation number in use when the corresponding agent was last part of the cluster. Incoming messages for a specific Application Agent 43 are filtered by comparing the membership generation number for the last cluster kept by the agent with the membership generation numbers carried in the incoming messages. The membership generation number carried by a message must be older or equal to the generation number corresponding to the last cluster kept by the Application Agent 43 for it to be accepted, otherwise the message is discarded or filtered.

The Node Membership Generation array 45 is part of the volatile data used in the filtering of stale messages. The array 45 includes an integer value for each node in the cluster. This value represents the membership generation in which the associated node was introduced to the cluster membership. An invalid membership generation number means that the corresponding node does not belong to the current membership. The messages to the nodes that do not belong to the current membership are filtered at the source nodes. The messages that are directed to destination nodes associated with valid membership generation numbers would have such numbers embedded in the message headers. At a receiver node, stale messages are filtered by comparing the embedded membership numbers with the membership generation number held by the receiver node.

The Agent Gates 46 are part of the volatile state in the Gated Messaging Subsystem 47 that is used in the filtering of inter-node messages. There is one Agent Gate 46 for each Application Agent 43 in the node. Each Agent Gate 46 preferably includes as many binary-valued entries as there are nodes in the cluster where each entry corresponds to a node in the cluster. Two possible values for the entries are "open" or "closed". If the Agent Gate 46 of a remote node is open, then the messages sent by the Application Agent 46 that owns the gate will be sent to the node, otherwise these messages are dropped by the Gated Messaging Subsystem 47 at the sender node. Incoming messages received through the gated_receive( ) function are filtered if the entry associated with a source node in the Agent Gate 46 is closed, otherwise the message is delivered to the destination Application Agent 43. The Agent Gates 46 are maintained using the information provided by Application Agents 43 through the cluster_attach( ) function and by the Communication Agent 42 through the disconnect( ) interface.

Figure 5:
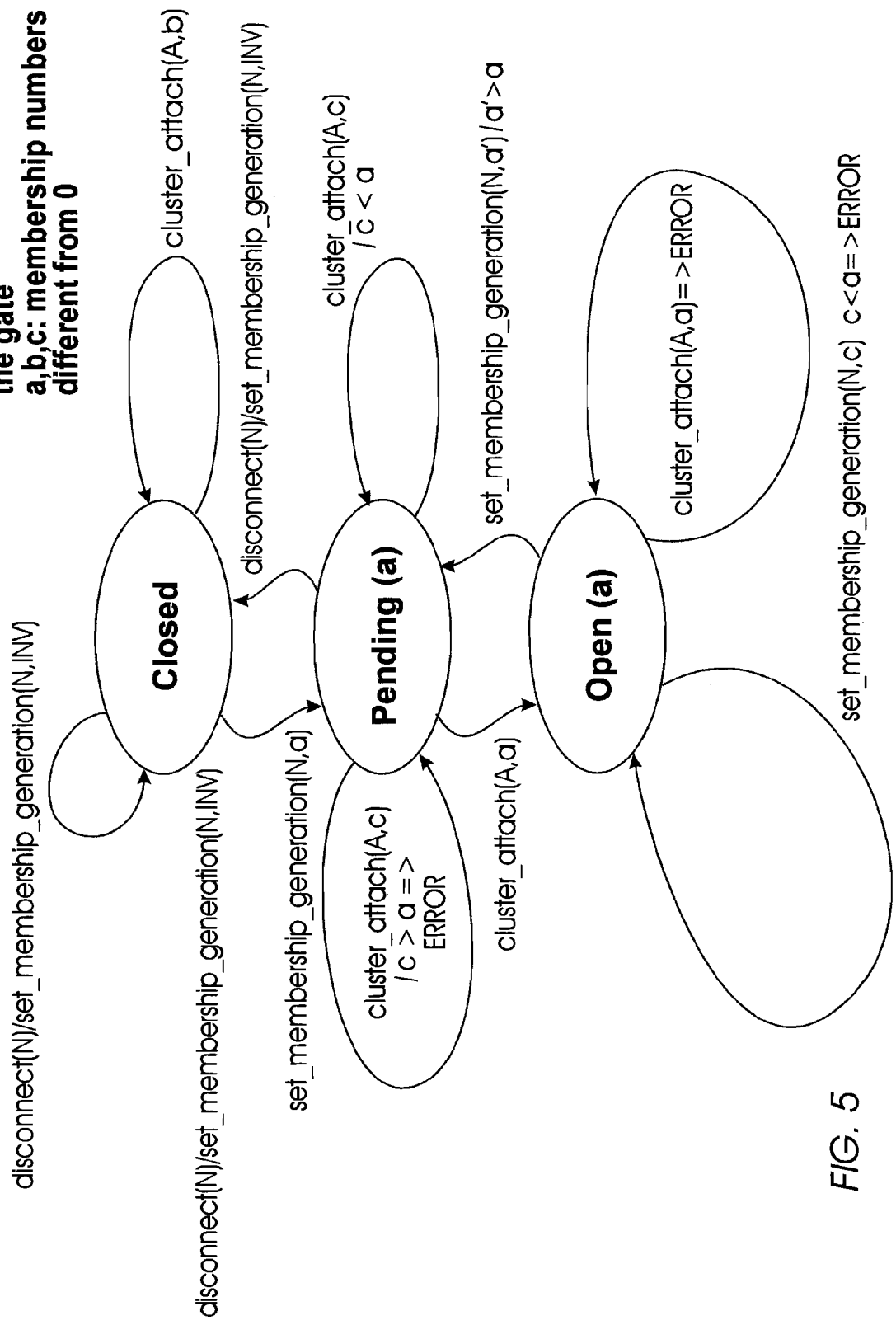
FIG. 5 is a diagram showing the different states of an agent gate in processing a new node to a cluster membership according to the invention.

FIG. 5 is a state diagram showing the different states of an Agent Gate in processing a new node to a cluster membership according to the invention. In this example, N represents the identification of a node, A is the identification of the Application Agent that owns the Agent Gate, and (a,b,c) are the membership generation numbers other than zero. There are three key states: "closed", "open(a)" and "pending(a)". The "closed" state means that the Agent Gate is closed and no messages can be sent or received through the Agent Gate. The open(a) state means that the Agent Gate is open and the messages with membership generation number (a) can be sent or received through the Agent Gate. The pending(a) state means that the Agent Gate is still closed to the messages, but can be immediately opened when the Application Agents execute a cluster-attach operation with membership generation number (a). Each arrow in FIG. 5 is labeled with an operation and represents the change from one state to another state. For example, the operation cluster_attach(A,a) causes the Agent Gate to go from the pending(a) state to the open(a) state. In another example, the operation cluster_attach(A,b) causes the Agent Gate to remain in the closed state.

Figure 6:
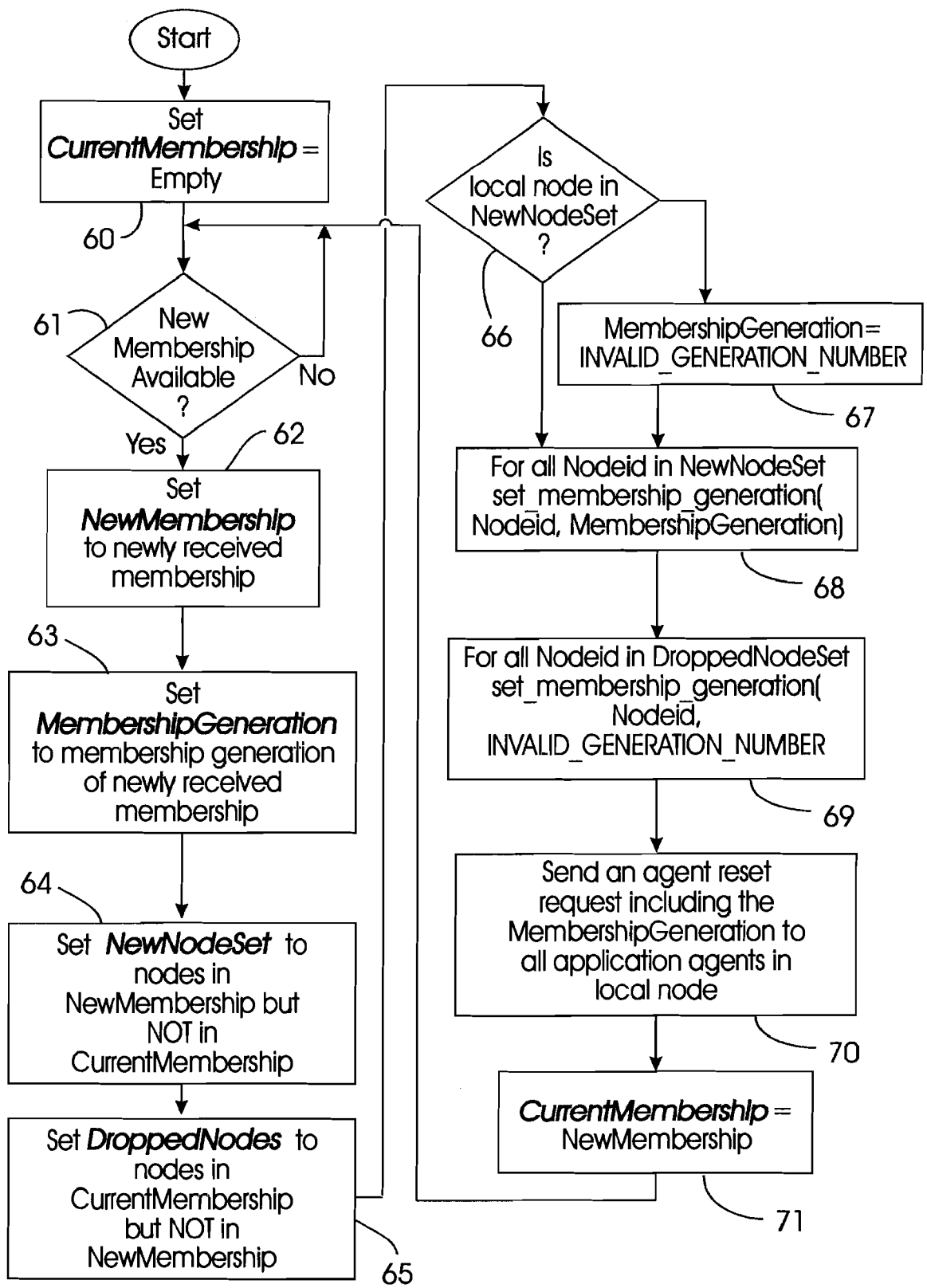
FIG. 6 is a flowchart representing a preferred embodiment for processing a new node to a cluster membership according to the invention.

FIG. 6 is a flowchart representing a preferred embodiment for processing a new membership to a cluster according to the invention. At step 60, the Cluster Membership Agent sets its CurrentMembership array to empty. This array includes the identification of the nodes (node IDs) that are currently in the cluster. It then checks whether a membership has been formed at step 61. At step 62, the Cluster Membership Agents in all nodes set their NewMembership arrays to the IDs of the nodes in the newly formed membership. At step 63, the Cluster Membership Agents in all nodes set their MembershipGeneration variables to the membership generation number of the newly formed membership. At step 64, the Cluster Membership Agents in all nodes set their NewNodeSet arrays to the node IDs of the NewMembership array, but not those in the CurrentMembership array. At step 65, the Cluster Membership Agents in all nodes set their DroppedNode arrays to the node IDS in the CurrentMembership array, but not in the NewMembership array. At step 66, the Cluster Membership Agents in all the nodes check to see whether the local node ID is in the NewNodeSet arrays of the nodes. If the answer is No, then the Cluster Membership Agents set their MembershipGeneration variables to an invalid generation number. The control is then passed to step 68. If the answer to step 66 is Yes, then at step 68, for every node ID in the NewNodeSet array, the Cluster Membership Agents in all the nodes update the membership generation of each node in their NewNodeSet arrays with the value of the MembershipGeneration variable. At step 69, the Cluster Membership Agents in the nodes update the membership generation of each node in their DroppedNodeSet arrays with the invalid generation number. At step 70, the Cluster Membership Agents in the nodes respectively send agent_reset requests to all the Application Agents of their nodes where the requests include the value the MembershipGeneration variable. At step 71, the Cluster Membership Agents in the nodes respectively set their CurrentMembership arrays to the values of their NewMembership arrays. The control is next passed to step 61.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. In a computer cluster system having multiple interconnected nodes each running a plurality of applications, a method for filtering stale messages resulting from changes in a cluster membership comprising:

maintaining a system-wide view of the cluster membership, the system-wide view represented by a membership identification;

for each node of the interconnected nodes in the cluster system, filtering messages to and from other nodes of the interconnected nodes based on the membership identification, said filtering occurring at a source and a destination node, and said filtering of messages to and from other nodes is further based on information about source nodes and destination nodes, the source nodes being the nodes sending the messages and the destination nodes being the nodes receiving the messages, and each node has one or more application agents which communicate with application agents in other nodes, and each node has a cluster membership agent for processing membership changes and communicating these changes to the application agents in said node; and, for each application, filtering messages to and from the nodes in a subset of nodes executing the application based on the membership identification and an application view of the cluster membership said application view provided by said application agents in communication with application agents in the subset of nodes involved in executing said application, maintaining inter-node unicast application related communication across said subset of nodes in the case that membership of said subset of nodes remain unchanged during a change in cluster membership elsewhere in said computer cluster system, and each of said messages include the membership identification of the cluster membership into which the destination node was accepted, as recognized by the source node.

2. The method as recited in claim 1 further comprising the step of detecting when another node is disconnected from the cluster membership.

3. The method as recited in claim 2 further comprising the step of updating the filters in said each node with the membership identification reflecting the disconnected node.

4. The method as recited in claim 1 further comprising the step of, in each node, keeping track of the membership identification in the form of a monotonically increasing number.

5. The method as recited in claim 1 further comprising:

identifying each successive generation of the cluster membership by the membership identification; and communicating said membership identification to other nodes in the membership when the identification is first established.

6. The method as in claim 1 further comprising the step of filtering messages between applications running in different cluster nodes using a plurality of node filters at a destination node, said node filters corresponding to the nodes from which the messages originate.

7. The method as recited in claim 1 further comprising the step of filtering messages between applications running in different cluster nodes using a plurality of application filters at a destination node, the application filters corresponding to the nodes from which the messages originate.

* * * * *